United States Patent
Rogers et al.

(10) Patent No.: US 6,911,159 B2
(45) Date of Patent: Jun. 28, 2005

(54) PHOSPHORESCENT PIGMENTS

(75) Inventors: Barry Rogers, Mentone (AU); Tony Rogers, Mentone (AU)

(73) Assignee: Nite-Glo Innovations Pty Ltd, Berwick (AU)

( * ) Notice: Subject to any disclaimer, the term of this patent is extended or adjusted under 35 U.S.C. 154(b) by 0 days.

(21) Appl. No.: 10/312,225

(22) PCT Filed: Jun. 22, 2001

(86) PCT No.: PCT/AU01/00749

§ 371 (c)(1),
(2), (4) Date: Jul. 14, 2003

(87) PCT Pub. No.: WO01/98433

PCT Pub. Date: Dec. 27, 2001

(65) Prior Publication Data

US 2004/0011997 A1 Jan. 22, 2004

(51) Int. Cl.⁷ .......................... C09D 11/00; C09K 11/02; C09K 11/08; C09K 11/80
(52) U.S. Cl. .......................... 252/301.4 R; 252/301.4 F; 252/301.6 F; 428/404; 428/406; 428/403
(58) Field of Search ................................. 428/404, 406, 428/403, 690; 252/301.4 F, 301.6 F, 301.4 R

(56) References Cited

U.S. PATENT DOCUMENTS

| | | |
|---|---|---|
| 4,339,501 A | 7/1982 | Inoue et al. |
| 5,122,305 A | 6/1992 | Ashley et al. |
| 5,126,573 A | 6/1992 | Knuepfer et al. |
| 5,289,081 A | 2/1994 | Tamatani et al. |
| 5,376,303 A | 12/1994 | Royce et al. |
| 5,518,808 A * | 5/1996 | Bruno et al. ............... 428/323 |
| 5,686,022 A | 11/1997 | Murayama et al. |
| 5,811,154 A | 9/1998 | Ronda et al. |
| 6,242,056 B1 * | 6/2001 | Spencer et al. ............. 427/512 |

FOREIGN PATENT DOCUMENTS

| | | |
|---|---|---|
| EP | 849344 A | 6/1998 |
| EP | 960915 A | 12/2001 |
| JP | 01/110590 A | 4/1989 |
| JP | 09/263753 A | 10/1997 |
| JP | 10/204429 A | 8/1998 |
| JP | 2000-087103 A | 3/2000 |
| JP | 2000-204367 A | 7/2000 |
| JP | 2000/256591 A | 9/2000 |
| WO | 98/21739 A | 5/1998 |
| WO | 00/11104 A | 3/2000 |

* cited by examiner

*Primary Examiner*—C. Melissa Koslow
(74) *Attorney, Agent, or Firm*—Christensen O'Connor Johnson Kindness PLLC

(57) ABSTRACT

Improved phosphor pigments are disclosed. The pigments consist of an inorganic phosphor pigment such as a $Eu^{2+}$ activated alkaline earth metal aluminate/silicate which is bonded to borosilicate glass balloon microspheres. The density of the improved phosphor pigments is preferably in the range 0.20 to 1.50 $g/cm^3$. A process for preparing the improved phosphor pigment is also disclosed.

11 Claims, No Drawings

PHOSPHORESCENT PIGMENTS

CROSS REFERENCE TO RELATED APPLICATION

This application is a national stage application of prior International Application No. PCT/AU01/00749, filed Jun. 22, 2001, the benefit of the filing date of which is hereby claimed under 35 U.S.C. § 120, which in turn claims the benefit of Australian application No. PQ 8267, filed Jun. 22, 2000, and Australian application No. PR 4041, filed Mar. 28, 2001, the benefit of the filing dates of which are hereby claimed under 35 U.S.C. § 119, and which are incorporated herein by reference.

TECHNICAL FIELD

This invention relates to improved long lasting phosphorescent pigments and methods for preparing these pigments.

BACKGROUND TO THE INVENTION

Fluorescence is a phenomenon where a material emits visible radiation when the material is excited by an external excitation source. A fluorescent lamp and a cathode ray tube each emit fluorescence. A material which emits fluorescence is called a phosphor. When light emitted by a phosphor lasts after cessation of excitation for a duration of time sufficient for the light to be perceived by the eye, i.e., about 0.1 second or longer, the light is called phosphorescence. A phosphor which has a long persistent phosphorescence lasting for several hours at room temperature is called a long-lasting phosphor or a light storage phosphor and it is to such materials that the present invention relates.

There are two types of prior art long-lasting phosphors materials namely a sulfide represented by ZnS:Cu and an $Eu^{2+}$ activated alkaline-earth metal aluminate $RAl_2O_4$ (R being an alkaline-earth metal). The ZnS:Cu sulfide type of long-lasting phosphors have been used for several decades but they have the disadvantage that their after-glow lasts for a relatively short duration of time, usually, about three hours at the longest. Furthermore, this type of phosphor has a serious defect in that a decomposition reaction of $ZnS+H_2O$ and $Zn+H_2S$ takes place under the coexistence of ultraviolet ray contained in the sunlight and moisture contained in the air. This renders the phosphor black in colour and, as a result, the after-glow characteristics significantly deteriorate within a relatively short period of time. For this reason, this type of phosphor has had only limited applications such as a luminous watch and a night-time display of a location in a house.

In order to improve the brightness and the length of after-glow, radioactive luminescent materials have been made, in which some radioactive elements such as CO, Ra, $H_3$ were added. Such modifications can lead to the phosphor continuously giving out light. These phosphors have been used in aircraft dashboards and clocks. However, due to the possibility of radioactive contamination and the relatively high cost, the application of these phosphors has been severely limited.

Relatively $Eu^{2+}$ activated alkaline metal aluminate long lasting phosphors have been developed (U.S. Pat. Nos. 5,376,303 and 5,424,006). These exhibit higher phosphorescence brightness, longer after-glow lifetime as well as better chemical durability and light resistance than the ZnS:Cu phosphors. These newly developed aluminate phosphors are anticipated to have wide applications such as signage, in addition to the existing applications for luminous watches and vehicle instruments.

Most of the known phosphor materials are subject to hydration when suspended in an aqueous solution and this causes them to suffer deterioration of performance. This in turn prevents the use of these materials in certain applications and in particular as pigments in water-based paints. Their use is limited to solvent-based solutions, resins, binders and heat formed compound plastics. However, their use in these applications is further limited to varying degrees from other negative characteristics. For example, it is not practical to obtain a stable suspension of known phosphor materials in solutions or emulsions because the phosphor material tends to settle. This is due to the high specific gravity of the phosphor materials which are typically in excess of 3 $g/cm^3$. If settlement occurs with these phosphor materials the particles tend to solidify into a mass that is extremely difficult to break up and redisperse throughout the solution or emulsion. This characteristic of the phosphor materials dictates that the untreated phosphor materials be suspended in a given solution or emulsion on an in-situ basis immediately before use. In many applications this can be inconvenient.

A further problem arises with many known phosphor materials. They tend to be hard materials with various crystal structures. The hardness and crystal structures combine to make the phosphor materials highly abrasive. These characteristics are the largest contributors of frictional wear on processing machinery such as discs involving the use of phosphor materials with compound plastics and solutions. This frictional wear results in premature machinery wear and costly maintenance.

As well as the aluminate phosphors discussed above, silicate phosphors are also known. Furthermore, phosphors which contain a mixture of silicon and aluminium are known. Apart from limitations with colour and the length of the after-glow these known phosphors have other deficiencies, some of which have been described above.

SUMMARY OF THE INVENTION

This invention provides in one form an improved long lasting phosphor pigment comprising:

5 to 95 wt % of an inorganic long lasting phosphor pigment;

5 to 95 wt % of ceramic balloon microspheres wherein the outer surface of the ceramic balloon microspheres are bonded to the phosphor pigment.

Preferably the ceramic balloon microspheres are glass.

Preferably the ceramic balloon microspheres are borosilicate glass.

Preferably the inorganic phosphor is a $Eu^{2+}$ activated alkaline earth metal aluminate or silicate or aluminate/silicate.

Preferably the wt % of inorganic phosphor pigment is in the range 40 to 80% and the wt % of the ceramic or silica particles is in the range 20 to 60%.

Preferably the density or specific gravity of the improved phosphor pigments is in the range of 0.20–1.50 $g/cm^3$.

In an alternative form the invention provides a process for preparing improved phosphor pigments comprising the steps of:

treating an inorganic phosphor pigment to hydrate the surface of the phosphor pigment;

bonding the outer surface of ceramic balloon microspheres to the surface of the inorganic long lasting phosphor pigment.

DETAILED DESCRIPTION OF THE INVENTION

The first step in the treatment process advances the natural hydration of the phosphor type material. This is achieved utilising a strong acid, such as 15% hydrochloric acid, 85% water solution, which effectively pre-hydrates the phosphor materials at a rapid rate, and in a controlled manner, so as to render the materials natural hydration process mostly spent and does so without detrimental effect on its performance. This allows the suspension of the treated phosphors at a high solids content in polymer solutions and emulsions. Other strong acids such as phosphoric acid may also be used by adjusting the concentration of the acid in water to suit.

The heat resistant glass balloon microsphere is bonded to the surface of the hydrated surface of the phosphor pigment as follows. In a preferred process the soda lime borosilicate glass spherical bubbles (Na,CO,.CaO.SiO,NaO,KO,BO, AlO) are attached or bonded to the phosphor material. It will be appreciated that in this process, as the bubbles are attached or bonded to the phosphor material, the bond is formed between the outer surface of the glass bubble and the phosphor. The micro spherical glass bubble or balloon used has a very low specific gravity by weight, typically 0.15 g/cm$^3$. It is chemically inert and exhibits high heat and crush resistance qualities. They are hollow glass spheres. By attaching or bonding the particles of phosphor materials to the glass micro spherical bubbles the specific gravity of the modified phosphor materials is able to be reduced. The reduction in specific gravity is directly related to the ratio of the volume of phosphor materials to the volume of glass micro spherical bubbles. By using this method it is possible to design a specific gravity-by-volume ranging from approximately 18 g/cm$^3$ to close to the natural specific gravity-by-volume of the untreated phosphor material concerned. The preferred density of the modified phosphor is in the range 0.20–1.50 cm$^3$.

The micro spherical glass bubbles that are used have sufficient optical clarity so as not to interfere with the irradiation and correspondingly the radiation of the phosphor materials. This effectively maintains the normal operation of the phosphor materials including their normal range of excitation frequencies, exposure durations, discharge frequency ranges and durations.

The treated phosphor materials can then be permanently suspended across the viscosity range encountered in any solutions that it may be required.

The bond achieved is believed to be a weak valence bond established by the hydration reaction of phosphor materials and the soda lime borosilicate glass micro spherical bubbles when jointly exposed to a strong acid, water solution such as 15% hydrochloric acid/85% water. Surprisingly we have also found that amorphous silica may be used to achieve excellent results when used to partially replace the preferred glass spherical bubbles. Low density products are also achieved. Although the optical clarity using amorphous silica is less than that achieved using glass microballoons satisfactory performance can be also achieved for certain purposes when the amorphous silica partially replaces the ceramic balloon microspheres. Other ceramic or silica materials can be used such as Ceramic Microspheres supplied by 3M and expanded perlite which is a form of siliceous lava.

The soda lime borosilicate bubble micro spheres are typically in a fine powder form and may present a dust hazard during handling and processing. With this in mind, the micro spheres should be handled in accordance with the appropriate and relevant regulations pertaining to materials which present a dust hazard.

A sealed tumbler powder mixing system is preferably used. This is equipped with airflow drying and filtered air and vapour venting system. The treatment process may release a small amount of hydrogen gas in non-hazardous trace element quantities along with water vapour.

All equipment is constructed from stainless steel and is lined with polyethylene.

The invention will be further described by reference to a preferred embodiment described in the following examples.

EXAMPLE 1

| | |
|---|---|
| soda lime borosilicate microspheres + | 300 g |
| strontium aluminate phosphor pigment * | 700 g |
| hydrochloric acid 15% solution | 40 g |

Into a plastic mixing vessel the following materials were added:

| | |
|---|---|
| Hydrochloric Acid (30% concentration) | 500 ml |
| De-ionised water | 500 ml |

The soda lime borosilicate micro spheres were added to the tumbler mixer and then the above hydrochloric acid solution was added.

The tumbler mixer was sealed and the contents agitated for 10 minutes.

In the tumbler mixer, the strontium aluminate phosphor pigment was spread over the acid moistened soda lime borosilicate micro spheres. After this addition, the tumbler mixer was again sealed and mixing was commenced with an airflow being pumped into the mixture. Traces of hydrogen gas and water vapour that were generated during the tumbling action were evacuated. The tumbling mixing was continued for three hours or until the mixture was thoroughly dry.

The theoretical density of the phosphorescent pigment was 0.46 g/cm$^3$ using the Nemoto pigment.

+Brand name "Scotchlite Glass Bubble K15". Particle size=15–1255 μm, pH=9, Specific Gravity=0.15 g/cm$^3$. Available from Zeelan Industries Inc., 3M Center Bldg, 220-8E-04, St. Paul, Minn., USA.

* Brand name "Luminova G300 M" or "Luminova GB300M", Particle size=4.6–91 μm. pH=10. Specific Gravity=3.65 g/cm$^3$. Available from Nemoto & Co. Ltd, 1-15-1, Kamigoi, Suginami-ku, Tokyo 167-0043, Japan.

EXAMPLE 2

Example 1 was repeated replacing the Nemoto pigment with an equal weight of pigment from Shandon Lunbo. The pigment used was brand name "Lunbo G34-200-A1" or "Lunbo G35-200A", Particle size=4.0–95 μm. pH=10. Specific Gravity=4.2 g/cm$^3$. Available from Shandong Lunbo Ind. & Comm. Group Co Ltd, 3/86 Chaoshan Street, Jinan, Shandong, China.

The modified pigment was prepared as in Example 1 and exhibited similar properties except that the theoretical density was 0.45 g/cm$^3$.

Since modifications within the spirit and scope of the invention may be readily effected by persons skilled in the art, it is to be understood that the invention is not limited to the particular embodiment described, by way of examples, hereinabove.

What is claimed is:

1. An improved long lasting phosphor pigment composition comprising:

5 to 95 wt % of an inorganic long lasting phosphor pigment;

5 to 95 wt % of ceramic balloon microspheres wherein the phosphor pigment is bonded to the outer surface of the ceramic balloon microspheres.

2. An improved phosphor pigment composition as defined in claim 1 wherein the balloon ceramic microspheres are glass.

3. An improved phosphor pigment composition as defined in claim 2 wherein the ceramic balloon microspheres are borosilicate glass.

4. An improved phosphor pigment composition as defined in any one of claims 1 to 3 wherein the inorganic phosphor is a $Eu^{2+}$ activated alkaline-earth metal aluminate.

5. An improved phosphor pigment composition as defined in any one of claims 1 to 3 wherein the inorganic phosphor is a $Eu^{2+}$ activated alkaline earth metal silicate.

6. An improved phosphor pigment composition as defined in claim 4 wherein the weight percent of inorganic phosphor pigment is in the range of 40 to 80% and the weight percent of the ceramic balloon microspheres is in the range of 20 to 60%.

7. An improved phosphor pigment composition as defined in claim 6 wherein the density of the improved phosphor pigment is in the range of 0.20 to 1.5 $cm^3$.

8. A process for preparing an improved phosphor pigment composition comprising the steps of treating an inorganic phosphor pigment to hydrate the surface of the phosphor pigment, bonding the outer surface of ceramic balloon microspheres to the surface of the inorganic phosphor pigment.

9. A process for preparing an improved phosphor pigment composition as defined in claim 8 wherein the inorganic phosphor pigment is a $Eu^{2+}$ activated alkaline earth metal aluminate, silicate or aluminate/silicate.

10. An improved phosphor pigment composition as defined in claim 5 wherein the weight percent of inorganic phosphor pigment is in the range of 40 to 80% and the weight percent of the ceramic balloon microspheres is in the range of 20 to 60%.

11. An improved phosphor pigment composition as defined in claim 10 wherein the density of the improved phosphor pigment is in the range of 0.20 to 1.5 $g/cm^3$.

* * * * *

UNITED STATES PATENT AND TRADEMARK OFFICE
CERTIFICATE OF CORRECTION

PATENT NO. : 6,911,159 B2  Page 1 of 1
DATED : June 28, 2005
INVENTOR(S) : B. Rogers et al.

It is certified that error appears in the above-identified patent and that said Letters Patent is hereby corrected as shown below:

Title page,
Item [75], Inventors, "Mentone" should read -- Melbourne --; and "Mentone" should read -- Rosanna --.
Item [30], Foreign Application Priority Data, insert in appropriate order:
-- Jun. 22, 2000 (AU)    PQ 8267
   Mar. 28, 2001 (AU)    PR 4041--.

Column 6,
Line 3, "$cm^3$." should read -- $g/cm^3$. --.

Signed and Sealed this

Fourth Day of April, 2006

JON W. DUDAS
*Director of the United States Patent and Trademark Office*